July 10, 1962    M. ROSENTHALER    3,042,964
FORMATION OF MEAT PRODUCTS
Filed July 17, 1958    3 Sheets-Sheet 2
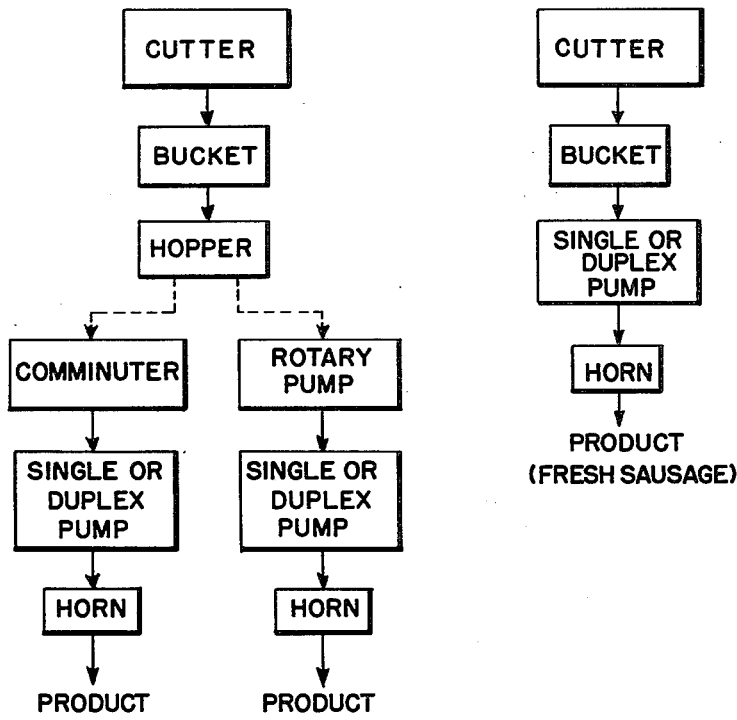
FIG-2 — FINE EMULSION ITEMS (WEINERS, BOLOGNA, ETC.) / BLEND MEAT ITEMS (PIMENTO LOAF, ETC.)
FIG-3 — PRODUCT (FRESH SAUSAGE)
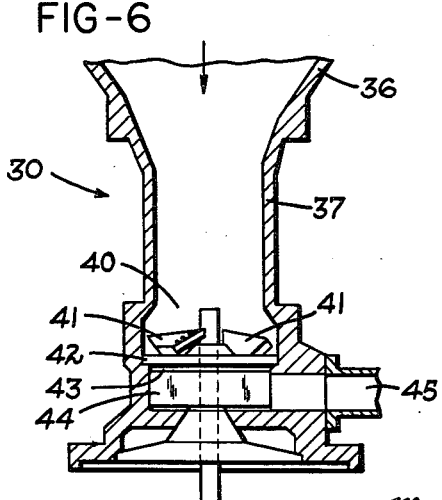
FIG-6
INVENTOR.
MILTON ROSENTHALER
BY
ATTORNEYS July 10, 1962
M. ROSENTHALER
3,042,964
FORMATION OF MEAT PRODUCTS
Filed July 17, 1958
3 Sheets-Sheet 3
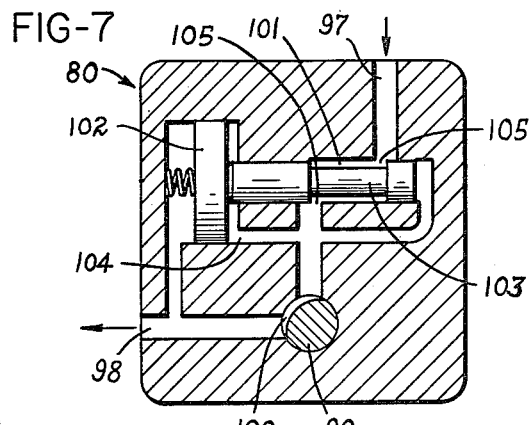
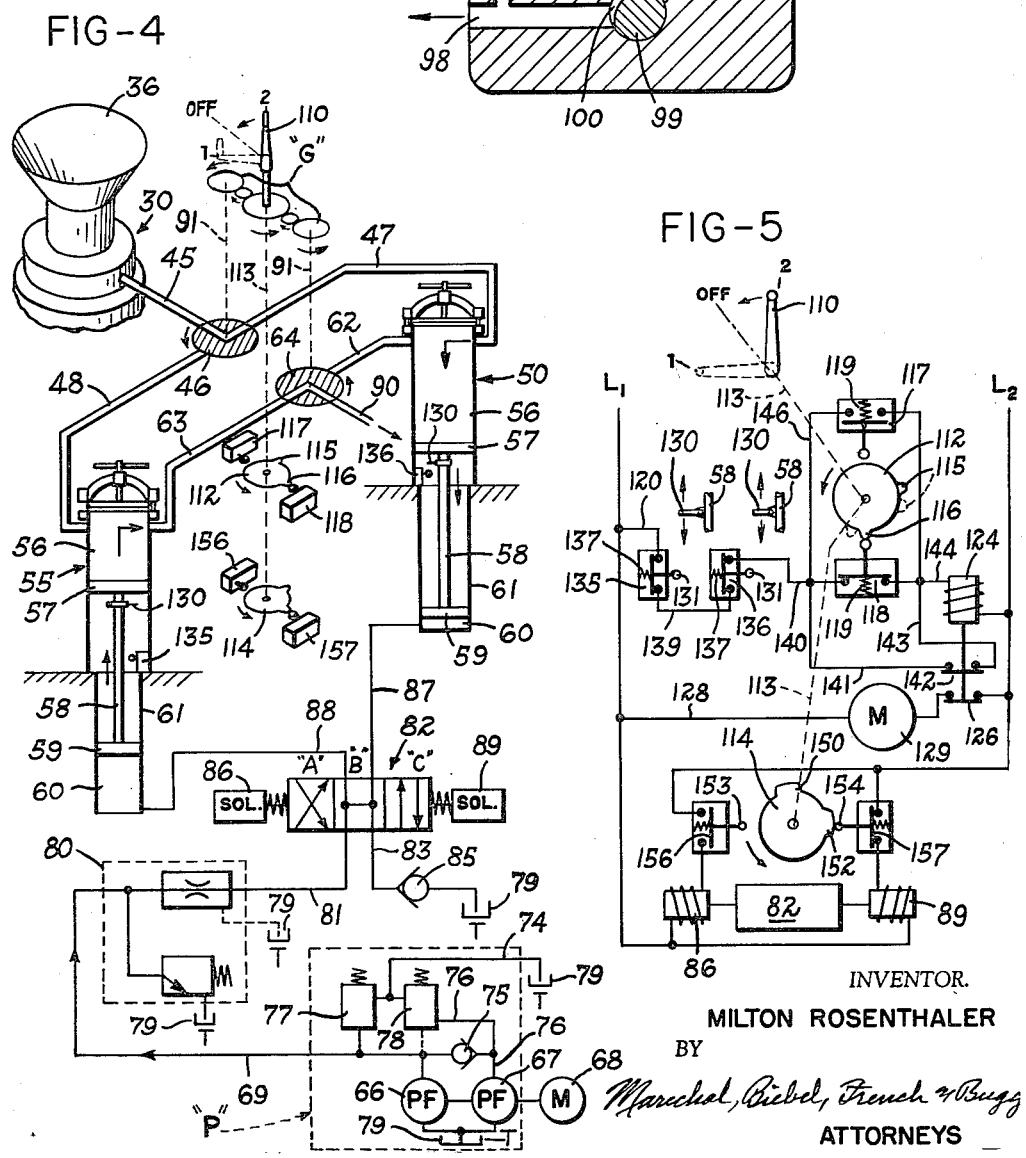
INVENTOR.
MILTON ROSENTHALER
BY
Marechal, Biebel, French & Bugg
ATTORNEYS 3,042,964
FORMATION OF MEAT PRODUCTS
Milton Rosenthaler, Dayton, Ohio, assignor to The Sucher Packing Co., Dayton, Ohio, a corporation of Ohio
Filed July 17, 1958, Ser. No. 749,179
7 Claims. (Cl. 17—35)

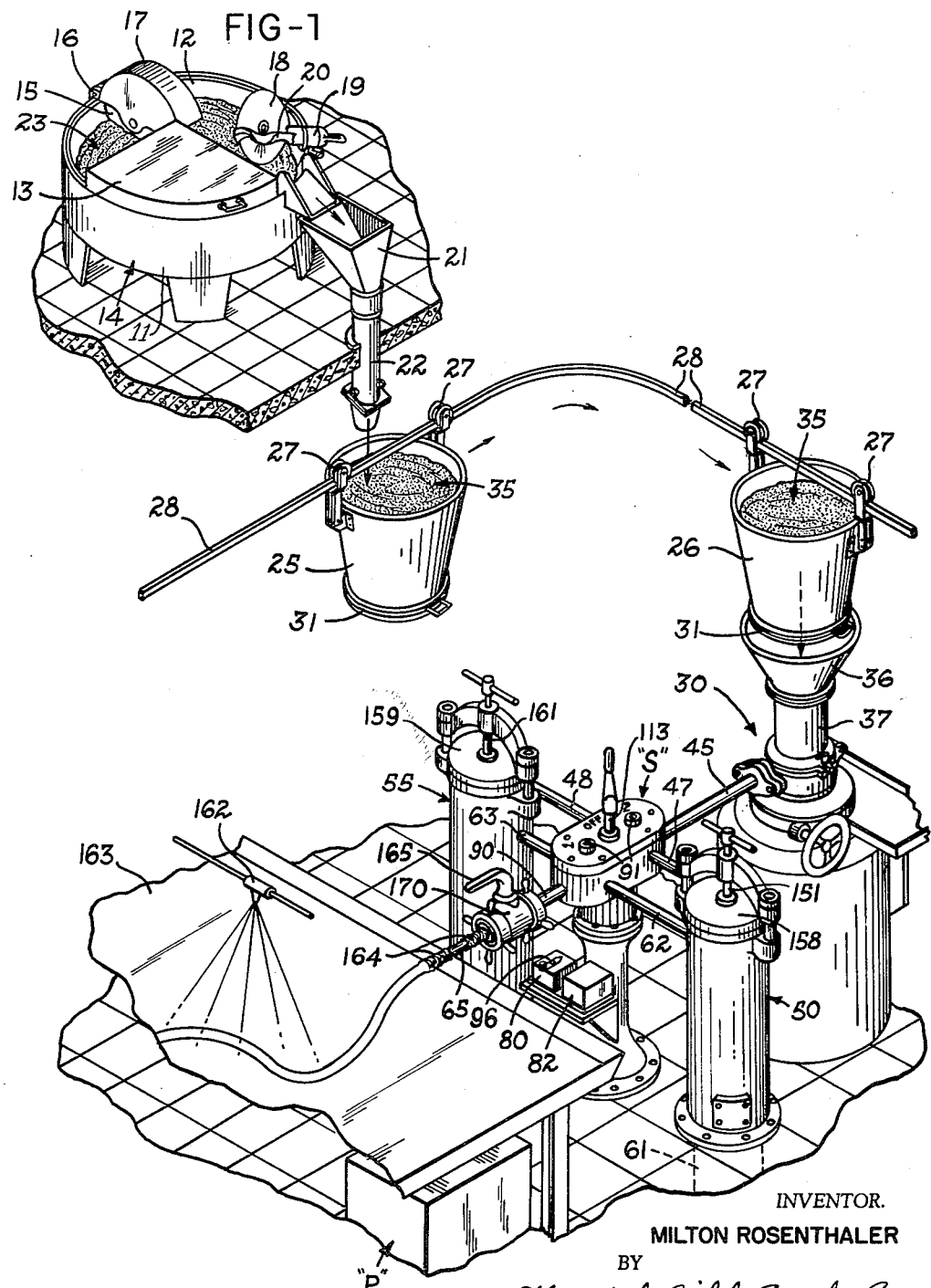

This invention relates to an apparatus and process for forming meat products from extrudible emulsified meat materials.

This invention incorporates a system for meat handling in which the meat material is subjected to a pumping action which serves to transfer the meat material through the apparatus. To secure a substantially uniform flow of meat material there is generally provided a rotary pump for this purpose. For further details of the advantages residing in this method of meat handling, reference may be made to application Serial No. 749,220 filed concurrently with this application.

In the manufacture of meat products such as bologna, loaf, weiners and the like, the meat material is first converted to a thick emulsion state and is thereafter conveyed to what is known in the art as a "stuffer." These stuffers are cylindrical vats which are generally hand loaded or otherwise charged with a quantity of extrudible meat material. The base of the vat forms a piston movable upwardly by fluid pressure to pressurize the meat material, thereby serving to extrude the meat material through an extruder horn and into an artificial or natural casing.

Many serious shortcomings are involved in this described procedure. The stuffer tends to make a non-uniform product because the meat material is discharged at different linear rates from the extruder horn as a result of change in the extrusion pressure which varies depending upon the number of stuffers in operation, there being generally a single pressure source for a number of these stuffers. Forming the meat product by the stuffer method of manufacture is awkward and time consuming because the stuffer is batch loaded and the meat material is usually shoveled into the stuffer by hand, so that productivity is severely limited. Also, the apparatus is difficult to clean, with the stuffer being the most likely source of contamination of the meat product.

The stuffers also tend to be unhygienic since the meat material is exposed during handling and hence is subject to contamination. Another result of the exposure of meat material in an "open" system is that the meat material tends to include gaseous voids or other irregularities in the final product.

It is one of the objects of the present invention to provide apparatus for handling meat material in a more hygienic manner so that the meat material is shielded from exterior contamination both while it is conveyed and while it is within the apparatus subjecting the meat material to pressure. By so limiting the exposure of the meat, there is substantially reduced possibility of contamination of the meat material by bacteria or foreign ingredients and therefore the manufactured meat product is much more sanitary.

It is a further object of the invention to provide an apparatus which is substantially continuous in operation and which can form a wide variety of meat products at appreciable rates of production. While the meat material is being moved at these accelerated rates, it is so provided that the meat material is never brought into contact with surfaces which are open to the exterior and therefore the meat material is moved through the apparatus with little or no chance of picking up contaminants.

Another object of the invention is to produce a uniformly sized meat product, i.e., one in which the weight per unit length is substantially uniform. The meat products can thus be sold by numbers of units and providing they are all of substantially the same length there is assurance of weight uniformity. This uniformity of sizing enables the package of meat to be within certain weight tolerances for any given number of units of the product. Thus, a dozen weiners manufacturable by this process will have a specified weight or fall closely within an acceptable weight range.

A still further object of the invention is based on a close tolerance control of the pressure on the meat material as it is extruded into the casing, the pressure being determinative of the linear discharge rate of the meat material. Such results are achieved by closely controlling hydraulic fluid pressure which operates the apparatus to discharge a quantity of meat material at a rate in proportion to said hydraulic fluid pressure. The operator then frees or retards the casing which receives the meat material to pay out the casing at a rate which is proportional to the meat material extrusion rate. Depending upon the uniformity of discharge rate of the meat material, the operator can achieve uniformity in sizing of the meat product.

Another object of the invention is to provide a process for forming meat products wherein the meat material is subjected to various pumping actions. It is intended that the pumping actions will serve not only to transport the meat material but further serves to obtain a uniformly sized meat product.

It is also a feature of the invention to regulate the rate of meat discharge by relating the discharge flow of meat material to a rate of hydraulic fluid flow. A suitable mechanism is then provided for maintaining a constant rate of hydraulic fluid flow regardless of pressure change, the result being a corresponding constant rate of meat flow but at a varying pressure. Variations of meat pressure will automatically compensate for changes in meat viscosity and friction within the apparatus.

Another object of the invention is to provide an apparatus which will handle the meat material without subjecting it to high temperatures which tends to produce a melting of the fatty content thereof. If this overheating should occur, the meat product develops unattractive "fatty ends" which render the product of less pleasing and palatable appearance.

It forms an important part of the present invention that the final meat product has eliminated therefrom voids and air pockets which cause an unattractive and non-uniformly weighted meat product. This is achieved by handling the meat material within an enclosed system and during passage of the meat within the system the meat material is maintained in a compacted condition and is not exposed to air. The likelihood of the meat material picking up gaseous contamination is reduced to a minimum.

Other objects and advantages of this invention will be apparent from the following description, the accompanying drawings and the appended claims.

In the drawings—

FIG. 1 is an isometric view of the complete apparatus for forming the meat products;

FIG. 2 is a block diagram flow sheet showing the preliminary meat processing and subsequent handling procedures;

FIG. 3 is a complete block diagram flow sheet illustrating a method for making fresh sausage product;

FIG. 4 is a schematic diagram of the extrusion apparatus and hydraulic operating equipment therefor;

FIG. 5 is an electrical circuit diagram for controlling the foregoing apparatus;

FIG. 6 is a sectional view of the comminuter device which reduces the meat material to a fine emulsion as it moves through the apparatus; and FIG. 7 is an enlarged detail sectional view of a pressure compensated flow control valve used for obtaining constant rate of hydraulic fluid flow.

Referring now to the drawings, there is shown in FIG. 1 at a raised elevation, a meat cutter designated generally by reference numeral 14. The cutter 14 receives the meat material in its original scrap form and reduces it to an emulsion of viscid paste-like consistency similar to peanut butter and like emulsions.

The cutter 14 consists of a vat or housing 11 having an interior rotating liner 12 which is partially closed by a cover 13 extending over one sector of the vat. A plurality of cutter disk knives 15 are hinged at 16 to the edge of the vat 11 and are rotatable to slice up and churn or agitate the meat material 23 as it is caused to move past the disk knives. The cutter produces a chopping action which reduces the meat material to the desired consistency and fineness, the meat then being in an essentially emulsified state. A protective shield 17 may be provided over the knives as a safety precaution.

Once the meat material 23 is emulsified and reaches the desired consistency it is unloaded by a rotatable wheel 18 which is dipped into the emusified meat material and is power rotated by an attached motor 19. The emulsified meat material clings to the wheel 18 and as it is raised upwardly from the vat 11 it is scraped off by the nonrotatable plough 20 and falls over the edge of the vat 11 where it is caught in a chute 21 which directs it to a stand pipe 22. The stand pipe 22 gravity feeds the meat into bucket 25.

While any transporting means for the meat material is satisfactory, the means illustrative of the invention consists of buckets 25 which may be filled with emulsified meat material 35. The buckets 25 are supported by wheels 27 which ride on rail 28. The rail leads from the cutter 14 to comminuter (or rotary pump) 30, the comminuter being the point of inlet to the apparatus for forming the meat product. The bottom 31 of the bucket is removable to discharge the meat material 35 contained therein once the bucket 25 is moved to the position indicated by bucket 26.

Bucket 26 rests over a hopper 36 of the comminuter 30 which guides the flow of meat material 35 downwardly through a throat 37 (FIG. 6) and into a cutter chamber 40 where there are rotating knives 41 which slice up and churn the meat material and force it downwardly through a perforated disk 42. The subdivided flow of meat material is broken up into a number of fine streams as it passes into the lower chamber 43. Within the chamber 43 is a rotor 44 which discharges the meat material from the chamber, expelling it under pressure into the conduit 45. A vacuum is maintained in the chamber 43 so that the extruding meat material is drawn through the disk 42 and is then forced through conduit 45. A suitable comminuter for use in the present system is that shown in Patent No. 2,836,825 issued May 27, 1958. The comminuter 30 therefore consists of pumping means for supplying the food material 35 under pressure to the stuffing apparatus.

The meat material is conveyed through conduit 45 (FIG. 4) to a two-way valve 46 which directs the flow of meat material through one or the other of branch lines 47, 48 into one or the other of stuffing units 50, 55 of a duplex pump. Each of the units 50, 55 is identically constructed and includes a cylinder 56 with a pressure responsive piston 57 reciprocable therein.

A piston rod 58 connects each piston 57 with a second piston 59 contained in the fluid chamber 60 of cylinder 61. The fluid pressure in chamber 60 thus serves to raise the pistons 57 and 59 in cylinders 56 and 61 to discharge the meat material contained therein in a discharge or stuffing stroke between a retracted position in spaced relation to the outlet branch lines to a moved position adjacent the top of the units as shown in the illustration for unit 55. Meat discharges from the unit through one or the other of branch lines 62 or 63 depending upon the position of two-way valve 64 and operation of the units 50, 55. The branch lines 62, 63 connect with an extruder nozzle 65 which discharges the meat material into a natural or artificial casing that is received over the extruder nozzle 65, the casing being fed out at a rate corresponding to the linear rate of meat material discharge.

The hydraulic system for actuating the piston 59 includes two hydraulic fluid pumps 66 and 67 (FIG. 4) which are operated to a motor 68. When the flow of meat material is in moderate amount, only the pump 66 is used to pump fluid through the line 69. However, when the flow of meat material is in large amount then the pump 67 also contributes to the flow in line 69. A check valve 75 is provided to block the passage of fluid from line 76 to line 69 but the check valve 75 opens at a selected differential pressure to add the pumping action of pump 67 in line 69 when there is sufficient pressure drop in line 69 caused by a high demand of hydraulic fluid flow (which is directly proportional to meat flow). The check valve 75 operates responsively to pressure differential. The two pressures being the pressure in line 69 developed by pump 66 and the pressure in line 76 developed by pump 67. Relief valves 77 and 78 are arranged to dump fluid pressure from pumps 66 and 67 respectively to tank 79 through line 74.

This dual pump arrangement is especially advantageous for manufacturing different kinds of meat products. For example, for the manufacture of bologna it is desirable to have a low pressure, high volume rate of meat material discharge whereas a weiner product requires just the reverse conditions namely high pressure and low volume flow. It has been found that this dual pump arrangement offers a wide variation of pressure-volume operating conditions which are particularly suited to the manufacturing conditions required for these different meat products. The difference in operating requirements is automatically achieved by the apparatus through operation of the check valve 75 as previously described to allow the second pump to contribute to that of the first.

It will be appreciated that this dual pump arrangement can easily handle both bologna and wiener products which are manufactured at pressures of approximately 35 p.s.i. to 115 p.s.i. respectively and volumes of approximately 100 gallons per minute and 10 gallons per minute respectively.

The hydraulic line 69 is passed through a pressure-compensated flow control valve designated generally by reference numeral 80 (FIG. 8). Details of the structure of this valve are generally understood and well known to those skilled in the art. However, additional reference may be made to "Hydraulic Operation and Control of Machines" by McNeil published 1954 (Thames & Hudson) pages 91, 92. The function of the adjustable flow control valve 80 is to maintain a constant selected rate of fluid flow through line 81 and line 88 (or 87) into chamber 60 regardless of pressure changes in chamber 60 due to resistance changes in the apparatus or changes in viscosity of the meat material. The fluid chambers 60 are filled at a substantially constant rate in order to produce the selected rate of meat material flow. The constant rate of filling of the fluid chamber is achieved by setting the regulator portion 99 of flow control valve 80 to obtain the desired flow rate of hydraulic fluid into the fluid chamber 60 from line 81 to either of lines 87 or 88. As described, the flow control valve 70 is the hydraulic equivalent of a mechanical governor.

The line 81 is next provided with a solenoid operated valve designated generally by reference numeral 82, this valve being a three-position valve labeled sections "A," "B" and "C." The valve 82 is spring-centered to the position shown in FIG. 4 so that section "B" of the valve connects the open center to join line 81 with line 83 which dumps fluid pressure to tank 79 through a check valve 85. The check valve 85 therefore consists of means exerting a back pressure on the pistons 59 resisting their movement to the retracted position providing for the filling of the cylinders 61 under pressure substantially without voids. Solenoid 86 is energized to position valve 82 leftwardly so that section "C" is moved toward the left to connect line 81 with line 88 leading to the fluid chamber 60 for unit 55 and line 87 is connected with line 83 dumping hydraulic fluid from the chamber 60 operating unit 50, to the tank 79.

When solenoid 89 is energized the valve 82 is operated rightwardly so that section "A" is moved toward the left to connect line 81 with line 87, pressurizing fluid chamber 60 combined with unit 50 and to connect line 88 with line 83 bleeding fluid from the chamber 60 combined with the unit 55.

The uniformity in sizing of the meat product depends to a large extent upon achieving a substantially constant rate of meat discharge from the extruder nozzle 65, and this in turn depends upon uniformity in rate of fluid transfer to the fluid chambers 60 actuating units 50 and 55. The pressure compensated flow control valve 80 is provided to insure a substantially constant rate of filling of the fluid chambers 60 combined with units 50 and 55, regardless of changes in fluid pressure, the structure for this being shown in FIG. 7.

It has not been found practical to regulate the rate of meat discharge by sensing directly the rate of flow of meat material, the viscid nature of the meat does not permit accuracy of direct measurement in flow rate. It has also been proposed to control the meat discharge rate by sensing the meat pressure and making suitable adjustments responsively to the meat pressure. While this last mentioned means has certain advantage, it is also possible to relate the flow of meat material to a rate of hydraulic fluid flow, and then provide a suitable mechanism for maintaining a constant rate of hydraulic fluid flow, regardless of pressure change so that there is a corresponding constant rate of meat flow also at a varying pressure. Variation in meat pressure will automatically provide for changes in meat viscosity, friction of the machine elements etc.

Referring to FIG. 7, there is shown a suitable volume control valve 80 which achieves the before described constant rate of hydraulic fluid displacement. The hydraulic fluid flow is then related to the meat flow by means of piston rod 58, piston 59 and pressure chamber 60.

The pressure drop between the inlet 97 and the outlet 98 is maintained at a constant value so that there is a uniform hydraulic fluid flow at the outlet 98 leading to the chamber 60 regardless of changes in fluid pressure at the inlet 97. Thus, the rate of hydraulic fluid flow at the outlet 98 will be under varying pressure and will automatically provide for changes in machine resistance and meat density and other resistance encountered by passage of the meat material through the extruder nozzle. However, the rate of fluid flow at the outlet 98 will remain constant for any selected setting of the other valve 99 to provide a constant rate of meat discharge through nozzle 65 although the pressure of the outlet fluid and therefore the pressure on the meat may vary as described.

The valve 80 is initially adjusted for the particular meat product by an eccentrically constructed throttle valve 99 which controls the effective area of orifice 100. The hydraulic line 101, conducts the fluid from the inlet 97 past the orifice 101, orifice 100 and the final pressure is fed back to a spring loaded piston 102 which positions a spool valve 103, thereby to maintain a constant pressure differential between inlet 97 and outlet 98. Thus, in operation, the pressure drop between inlet and outlet ports 97 and 98 is automatically maintained by continuously responsive movement of the spool valve 103.

A hydraulic balancing line 104 leads from the piston 102 to one end of the spool valve 95.

Once a setting is made of the throttle valve 99 there is a constant pressure differential maintained between inlet 97 and outlet 98 regardless of variations of the inlet pressure or outlet pressure.

The hydraulic fluid entering at the inlet 97 passes through orifices 105 which are controlled in their effective cross section by the spool valve 103. The line 104 communicates the fluid pressure to the piston 102, this pressure being effective over the entire area of the piston 102 since the balancing line 104 leads to one end of the spool valve 103 which develops a thrust against the piston 102. There is a pressure drop across variable orifice 100 which is then communicated to the one side of piston 102. The piston 102 is free floating and moves back and forth to a final position in accordance with the pressure developed on either side thereof. The back and forth movement of piston 102 serves to move the spool valve 103 so as to control the effective area of orifice 105, this action serving to maintain the same pressure drop between inlet 97 and outlet 98 regardless of changes in hydraulic pressure either at the inlet 97 or the outlet 98.

Referring to FIG. 5, there is shown the electrical circuit diagram for controlling operation of the apparatus. Operating off of the manually actuated control arm 110 are two interconnected cam wheels 112 and 114 shown connected by the dashed line (FIG. 4, 5) designated 113 which is a shaft or like structure.

The control handle 110 and the following described structure make up a selector subassembly designated generally by reference letter "S" in FIG. 1. The selector is so called because it functions to designate which of the pumping units 50, 55 will be discharged or filled with meat material. The structure is contained in a housing between the two pumping units as shown.

The cam wheel 112 has two cam lobes 115 and 116 which operate the switches 117 and 118 respectively. The cam lobes 115 and 116 are so constructed that they operate in one direction only and close momentarily the switches 117 and 118 so that when the control arm 110 is in its final position the cam lobe 115 or 116 has left contact with the respective switches 117, 118 which is then spring biased to an open position. Thus, cam lobe 116 which is shown closing switch 118 is in the dotted line position when the lever arm 110 is at its final position (position "2," FIGS. 1, 7) so that the switch 118 is immediately reopened by its associated spring 119. A similar arrangement is made for switch 117 so that it also is only temporarily closed and then reopened by its associated spring 119. The purpose of the switches 117 and 118 is to energize a solenoid 124 which closes switch 126 to complete the circuit from $L_1$ to $L_2$ through conductor 128 and operate the motor 129 for actuation of comminuter 30.

Once the switch 118 is closed the current can pass through conductor 120, normally closed switch 135, conductor 139, normally closed switch 136 and conductor 140, through closed switch 118, conductor 144 to energize solenoid 124 which closes both of the switches 126 and 142. Closing of the switch 126 starts the comminuter motor 129 ("M"). Once the switch 142 is closed there is provided a holding circuit in shunt with switch 118 for continuing flow of current to the solenoid 124 even though the switch 118 is immediately opened. The solenoid 124 remains energized to keep the comminuter motor 129 running until either of the switches 135 or 136 is opened at which time the solenoids 124 is deenergized, opening switches 126 and 142 so that operation of the solenoid 124 and comminuter motor 129 is again under the control of switch 118.

The comminuter 30 transmits the meat material under pressure to one or the other of the units 50, 55. As comminuter 30 transmits meat material under pressure to one or the other of the cylinders 56 causing the piston 57 to retract, the hydraulic fluid exhausts from the fluid chamber 66 connected with the retracting piston. The hydraulic flow is slightly throttled by means of a spring loaded check valve 85 so that the meat material is packed under pressure into the cylinder 56. This prevents occurrence of voids or other irregularities therein. As meat material fills the units 50, 55, the piston 57 retracts carrying piston rod 58 therewith. The piston rod 58 moves a switch operating cam 130 downwardly against the cam follower 131 so that just before the end of the retracting stroke it will break contact of one of the switches 135, 136, these switches being normally closed by associated springs 137. The cams 130 operate the switches only when the cams 130 are moving downwardly, on the filling stroke and the stroke of the unit is such that the cam 130 moves past the cam follower 131 so that the switches are only momentarily opened and then immediately closed. When either of the switches 135 or 136 is opened, the current in conductors 120, 139, 140, 141 and across the closed switch 142, conductor 143, 144 to the solenoid 124 is broken, thus lifting the tandem switches 126, 142 and breaking the circuit through conductor 128 to shut off the motor 129 of the comminuter 30.

The open center valve 82 is also controlled by handle 110 which mechanically turns cam wheel 114 having cam lobes 150 and 152 which contact cam followers 153 and 154 respectively to close one or the other of the normally open switches 156 and 157 respectively.

In position "2" of the handle 110, the cam 152 closes switch 157 energizing solenoid 89 to move section "C" of valve 82 leftwardly thereby operating the pressure cylinder 60 combined with unit 55.

Closing of the switch 156 (FIG. 5) by movement of handle 110 from position "2" to position "1" will energize solenoid 86 to operate the three-position valve 82 so that section "A" is moved rightwardly to create hydraulic fluid connections to operate unit 50. The switches 156 and 157 and the solenoid valve 82 form electric hydraulic control means operated by the handle 110 and connected selectively to apply hydraulic fluid from the rate control 80 to the one of the pump units connected through the valve 64 to discharge through the nozzle 65.

While the meat is discharging from unit 55 (position "2" of the handle 110) the comminuter motor 129 has been started as previously described through cam wheel 112 so that the unit 50 is filling with meat material and will continue to be filled until the motor 129 is shut off by action of the cam 130 (FIG. 4) opening switch 136 (FIG. 5).

The cam lobes 150, 152 operating the switches 156, 157 are sufficiently large so that they hold the switches 156, 157 in closed position so long as the control handle 110 is maintained in positions "1" or "2." Once the pressure in cylinders 60 builds up to a certain amount the fluid is dumped to the tank 79 through relief valves 77, 78.

The control handle 110 may be moved to neutral position during which section "B" of the three-position directional valve is located as shown in FIG. 4 in which case neither of the pressure cylinders 60 connected with the units 50, 55 is actuated by the pumps 66, 67. In this case fluid is transmitted from pumps 66, 67 through line 69, valve 80, line 81, section "B" of valve 72, line 73, check valve 75 to tank 79.

Once the unit 55 (position "2") is completely discharged, the handle 110 is moved to its opposite throw arm position "1" so that valve 46 is rotated to connect branch 48 with conduit 45, and valve 64 connects branch 62 from unit 50 to the outlet conduit 90. This movement of the valves 46, 64 by the handle 110 is accomplished by means of gearing "G" connected with handle 110 and shafts 91 through gearing "G" to the respective valves 46, 64. Cam wheel 112 is turned so that lobe 115 momentarily contacts the follower on the normally open switch 117 (FIG. 5) allowing current flow through conductor 120, normally closed switch 135, conductor 139, normally closed switch 136, conductor 140, conductor 146, closed switch 117, conductor 144 to energize the solenoid 124 which closes tandem switches 142 and 126 thus closing the circuit through conductor 128 to energize the motor 129 and operate the comminuter 30. When the motor 129 starts, the meat material from the comminuter 30 flows into the unit 55 and starts to fill the same. Filling of unit 55 continues until the associated cam 130 operates follower 131 opening switch 135 and interrupting the holding circuit in shunt with switch 118 which acts through conductors 140, 141, switch 142, and conductor 143. When the holding circuit is interrupted by switch 135 at pump 55, the unit 55 has completely filled and the comminuter motor is shut off.

While the unit 55 is filling the unit 50 is discharging its quantity of meat material, lobe 150 of cam wheel 114 having been turned to close switch 156 to energize solenoid 86 so that section "A" of valve 82 moves rightwardly to create the fluid connections for operating unit 50.

When the handle 110 is moved back to position "2" the connections are as indicated in FIGS. 4 and 5.

When unit 50 is completely discharged the control handle is moved back to position "2." The control handle 110 is thus moved from one throw arm position to the other to actuate by turns the units 50 and 55.

Since the comminuter 30 fills the units 50, 55 faster than meat material discharges therefrom, one or the other of the units is always ready for meat extruding operation and therefore the apparatus can operate almost continuously to extrude meat material through the outlet 90 and then to the discharge nozzle 65 (or horn as it is sometimes referred to).

In operation, referring to FIGS. 1, 2, the meat material is first passed through the cutter 14 and then to the buckets 25 where it is transferred by rail to the hopper 36. Depending upon the meat product, the sequence of operation may then include either a comminuting action or rotary pumping action.

In the case where the meat material is to be extruded into a casing which is either natural or artificial to form such meat products as weiners, bologna, and the like, the meat material is passed through a comminuter which further emulsfies the meat material. From the comminuter 30 the meat material then passes to one or the other of units 50, 55 and from there it is passed through horn 65 and into the casing.

Where the final meat product is a loaf material which is a blend of ingredients, containing such further ingredients as pimento, olive, pepper, etc., the blend is not passed through a comminuter but instead a rotary pump is provided in place of the comminuter 30 (FIG. 2). The rotary pump then transfers the blend of materials to duplex piston pump which then pressurizes the blend of materials to extrude the same through a nozzle and into a mold instead of a casing.

In the case where only a single one of the units 50, 55 is used, the operation does not proceed continuously and therefore productivity is necessarily reduced. However, operation of the comminuter 30 may be controlled by retraction of a single one of the units, the same as in the duplex arrangement. However, control of meat flow, sanitation and uniformity of product, reduction of gas in the meat material are all retained as advantages regardless of the number of pump units.

Referring next to FIG. 3, the apparatus is suitable for forming fresh sausage meat products from ingredients which cannot be transmitted by pumping or subjected to comminuting. In the fresh sausage products, a larger particle size of meat is desired for the characteristic appearance, taste, cooking quality, etc. In this instance the meat material is not reduced to as fine a consistency in the cutter 14. Under the procedure of FIG. 3, the meat material from the cutter 14 is collected in buckets 25 and transferred directly to one or the other of the pumps 50, 55. Ends 158 and 159 of pumps 50, 55 can be opened by loosening the vise connections 160 and 161 respectively to allow access to the interior of the pump. The fresh sausage material is dumped directly into the open end of the pump, the piston 57 being caused to retract under the weight of the sausage material. The ends 158, 159 are then closed and clamped in place by vise connections 160, 161 and the meat material can be extruded from the pump through the extruder nozzle into a casing or mold as desired.

In operation, a water supply 162 is started to dampen the top of receiving table 165. The water will lubricate the table top and meat product in order to reduce friction and prevent damage to the meat product.

A 50 foot length of casing material 164 which is pleated or folded to collapse it into a short length is received over the extruder nozzle 65 and the end thereof is tied off. The handle 165 of an "on"-"off" control valve 170 in the outlet conduit 90 is then turned to allow meat material to pass through the extruder nozzle. It is so arranged that the apparatus will not run with the handle 165 in a closed position so that meat cannot become impacted in the extrusion lines. A suitable switching arrangement is provided for this purpose and is of conventional construction.

Assuming the production of meat products such as weiners, a quantity of emulsified meat material in buckets 25 is conveyed to the position indicated by the bucket 26 so that meat material 35 is discharging into the comminuter 30 below. The control handle 110 is then turned from the off position indicated in FIG. 1 to either position "1" or position "2." Assuming that the handle is turned to position "1" the valves 46 and 64 are operated to fill the pumping unit 50 and pump meat from pumping unit 55 as before described. The discharge rate of meat material is directly proportional to the hydraulic fluid flow developed in fluid pressure chambers 60. The operator stationed at the extruder nozzle controls by feel, the rate of pay off of casing 164 and he frees or retards the casing so that it will receive the extruding meat material therein at a substantially constant rate. Assuming a steady, constant discharge rate of meat material, the operator can control the rate of pay off of the casing 164 to achieve a uniformly sized product. The setting 99 of the control valve 80 by means of lever 96 is provided to deliver a given rate of hydraulic fluid flow to the pressure cylinders 60 operating units 50, 55, the flow of hydraulic fluid being always proportioned to the meat material discharging through the extruder nozzle 65.

When the unit 55 is completely discharged the handle is turned from position "2" to position "1" to operate valves 46 and 64 connecting comminuter 30 to unit 55 and unit 50 to extruder nozzle 65. At the same time the comminuter motor 129 is actuated through cam wheel 112, the comminuter being shut off by the switch 135 on unit 55 when the unit is filled. The cam wheel 114 in going from position "2" to position "1" is turned so that cam lobe 150 contacts follower 153 to close switch 156 and this moves the three-position valve such that section "A" is moved rightwardly. The fluid pressure source thus actuates unit 50 to discharge meat material into the casing 164.

For producing larger diameter meat products such as some forms of bologna and the like, greater quantities of meat material must be extruded through the extruder nozzle 65. This necessitates a large displacement of hydraulic fluid to operate the fluid motors for the units 50, 55. In this case, the appropriate setting is made by control 99 (FIG. 7) in the flow control valve 80. The fluid motors 60 then receive large quantities of fluid at a generally lower pressure, in the order of 35 p.s.i. and it is so provided that the check valve 75 (FIG. 4) will open at these pressures to allow pump 67 to pump fluid through the line 69 in conjunction with the pump 66. Thus, the amount of hydraulic fluid displacement increases to provide for the greater discharge of meat material.

Because of the close control which is achieved over the flow rate in the hydraulic system, there is similarly a close degree of control of the discharge rate of meat material which is always proportional to the flow rate in the hydraulic system. The uniformity of meat discharge rate is substantially unaffected by whatever setting is made of the flow control valve 80. Flow rates of from 10 to 100 gallons per minute in the hydraulic system produce corresponding flow rates of meat material and within this range there is no substantial variation of the meat discharge flow rate, this leading to uniform products of a considerable variety.

In all of the systems described the meat material is handled under protected conditions, minimizing the chance for inclusion of air or other contaminants. This provides greatly improved sanitation conditions. Moreover, the rate of meat product manufacture is substantially improved over previously known apparatus and methods of manufacture.

At the high discharge pressures the meat material is not appreciably changed in density, the only change being higher rate of meat discharge from the extruder nozzle.

It will be understood from the foregoing that the apparatus is capable of producing meat products of various sizes at the most suitable rate of manufacture for the respective product. Also, the apparatus can produce meat products of various compositions in which the method of meat handling is selected according to its composition.

The apparatus is adaptable for extruding meat material into a casing so as to achieve a uniformly sized product or it is equally suitable for extruding meat material into a mold to form loaf product.

While the form of apparatus herein described constitutes a preferred embodiment of the invention, it is to be understood that this invention is not limited to this precise form of apparatus and that changes may be made therein without departing from the scope of the invention which is defined in the appended claims.

What is claimed is:

1. A meat forming apparatus comprising a comminuter adapted to receive meat material and perform an emulsifying action thereon and to discharge comminuted material under pressure, a pair of oppositely-acting pumping units, a first conduit set connecting said comminuter to said pumping units to convey meat material under the discharge pressure of said comminuter to one of said pumping units causing filling thereof, a second conduit set operatively interconnected to said pumping units and having an extruder nozzle at the end thereof through which said meat material is forced as a discharge from the other said pumping units during discharging movement thereof, a pair of interconnected valves one in each of said conduit sets and having an operator's control handle movable for coordinating meat filling from said comminuter to one of said pumping units and opening said second conduit to the other of said pumping units for discharge of meat material through said second conduit set, and fluid pressure operated motors on each operatively connected with each said pumping unit for powering said pumping unit on the discharging stroke thereof and electric hydraulic control means operated by said handle and connected selectively to apply hydraulic fluid to the one of said units connected through said valves to discharge through said nozzle.

2. An apparatus for forming meat products from emulsified extrudible meat materials, comprising a pump means for receiving the meat material and imparting an impelling force thereto, a piston pump unit having a movable piston therein, first conduit means connected to transmit said meat material from said pump means to said piston pump unit, a second conduit means having an extruder nozzle at the discharge end thereof and having another end connected at said unit through which the meat material is passed as said piston moves on its meat-discharging stroke, a fluid pressure operated motor operatively connected to said piston of said pump unit for operation thereof, said piston pump unit being sealed with relation to said fluid pressure operated motor during all phases of operation thereof to avoid contamination of the meat material contained in said piston pump unit, control means having concurrently operated valves in said first and second conduit means for opening only said first conduit means to establish communication between said pump and said piston pump unit to cause said piston pump unit to fill with meat under pressure from said pump means without voids, said control means having another position in which the valve in said first conduit means is closed and the valve in said second conduit means is open to provide for extrusion of meat material through said extruder nozzle during the meat discharging stroke of said piston.

3. A meat casing stuffing machine for the uniform stuffing of casings at a constant volumetric rate comprising a cylinder having an inlet through which flowable food products may be admitted to said cylinder and an outlet, means including a casing stuffing horn connected to receive food products from said outlet for ejection into a food casing, a primary piston in said cylinder movable from a first position in spaced relation to said outlet to a second position to eject the contents of said cylinder through said outlet, a hydraulic motor having a power piston connected to effect displacing movement of said primary piston, a source of hydraulic fluid under pressure, and constant rate hydraulic control means connected to supply hydraulic fluid from said source to said motor at a substantially constant volumetric rate to effect movement of said primary piston at a rate proportional to said volumetric rate from said first position to said second position.

4. Sausage casing stuffing apparatus, comprising a pair of stuffing pumps each including a stuffing cylinder and a piston movable in each said cylinders, a stuffing nozzle, selectable control valve having a pair of selectable inlets connected to each said pumps and an outlet connected to said nozzle and operable to select each of said cylinders for discharge through said nozzle, a pair of liquid piston motors one each for each of said pumps and each having a direct operating connection to the associated said pistons of said pumps to effect displacing movement thereof, a source of operating liquid under pressure, a constant rate liquid regulator connected to said source for metering a quantity of said liquid at a predetermined constant rate, and liquid flow selector valve means connected to said regulator for operation with said control valve and connected to apply liquid from said regulator selectively to said piston motors for effecting displacing movement of said pistons resulting in flow from said nozzle at a constant rate directly related to said rate of hydraulic liquid flow.

5. Sausage casing stuffing apparatus, comprising a pair of stuffing pumps each including a stuffing cylinder and a piston movable in each said cylinders, a stuffing nozzle, a manual control including a selectable control valve having a pair of selectable inlets connected to each said pumps and an outlet connected to said nozzle and operable to select each of said cylinders for discharge through said nozzle, a pair of liquid piston motors one each for each of said pumps and each having a direct operating connection to the associated said pistons of said pumps to effect displacing movement thereof, a source of operating liquid under pressure, means connected to said source for metering a quantity of said liquid at a predetermined constant rate, a liquid solenoid operated flow selector valve having a connection to said metering means and said piston motors to apply liquid from said metering means selectively to said piston motors for effecting displacing movement of said pistons resulting in flow from said nozzle at a constant rate directly related to said rate of hydraulic liquid flow, and electric switches connected to control said flow selector valve and operated by said manual c ntrol for coordinating the said application of liquid with the selection of said pumps.

6. A food casing stuffing system for forming a uniformly packed food item with an extrudible food product, comprising pumping means for supplying such food product under pressure, a stuffing pump including a cylinder having an inlet and a stuffing outlet, a piston movable in said cylinder in a stuffing stroke between a retracted position in spaced relation to said outlet and a moved position adjacent said outlet, a stuffing nozzle connected to receive said food product from said outlet for extrusion into a casing during said stroke, means connecting said pumping means to discharge said food product into said cylinder at said inlet at the conclusion of said stuffing stroke, said piston being movable upon the filling of said cylinder by said pumping means between said moved position and said retracted position under the influence of said pressure of said pumping means, and means exerting a back pressure resisting the movement of said piston to said retracted position for the filling of said cylinder under pressure substantially without voids.

7. A food casing stuffing system for forming a uniformly packed food item with an extrudible food product, comprising pumping means for supplying such food product under pressure, a stuffing pump including a cylinder having an inlet and a stuffing outlet, a piston movable in said cylinder in a stuffing stroke between a retracted position in spaced relation to said outlet and a moved position adjacent said outlet, means connecting said pumping means to discharge said food product into said cylinder at said inlet at the conclusion of said stuffing stroke, a stuffing nozzle connected to receive said food product from said outlet for extrusion into a casing during said stroke, a hydraulic piston motor having an operative connection to move said piston in said stuffing stroke, and a check valve connected to dump hydraulic fluid from said motor during the return of said piston to said retracted position effecting a back pressure resisting such return movement and causing the filling of said cylinder under pressure substantially without voids.

References Cited in the file of this patent
UNITED STATES PATENTS

| | | |
|---|---|---|
| 889,122 | Hallahan | May 26, 1908 |
| 1,528,887 | Offenhauser | Mar. 10, 1925 |
| 2,248,835 | Van Hooydonk | July 8, 1941 |
| 2,794,210 | Opiekon | June 4, 1957 |
| 2,805,444 | Hensgen et al. | Sept. 10, 1957 |
| 2,842,177 | Schnell | July 8, 1958 |
| 2,851,073 | Schaller | Sept. 9, 1958 |

FOREIGN PATENTS

| | | |
|---|---|---|
| 546,915 | Italy | Aug. 3, 1956 |